June 11, 1957  O. DOERNER  2,795,248
EYEGUARD FOR POWER SAW
Filed Jan. 11, 1955  2 Sheets-Sheet 1
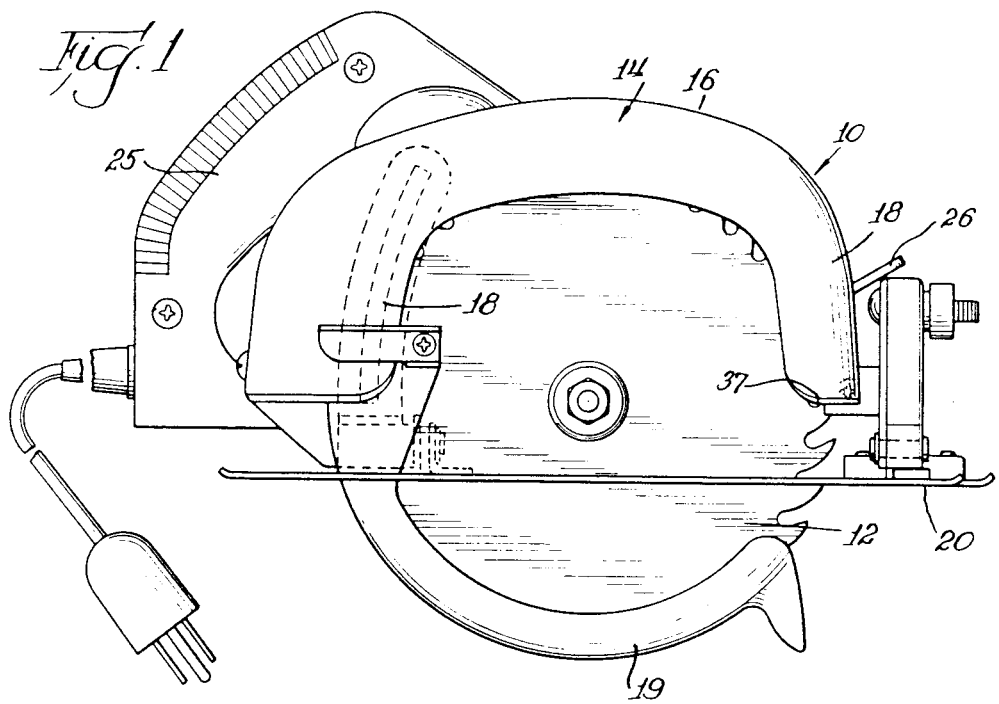
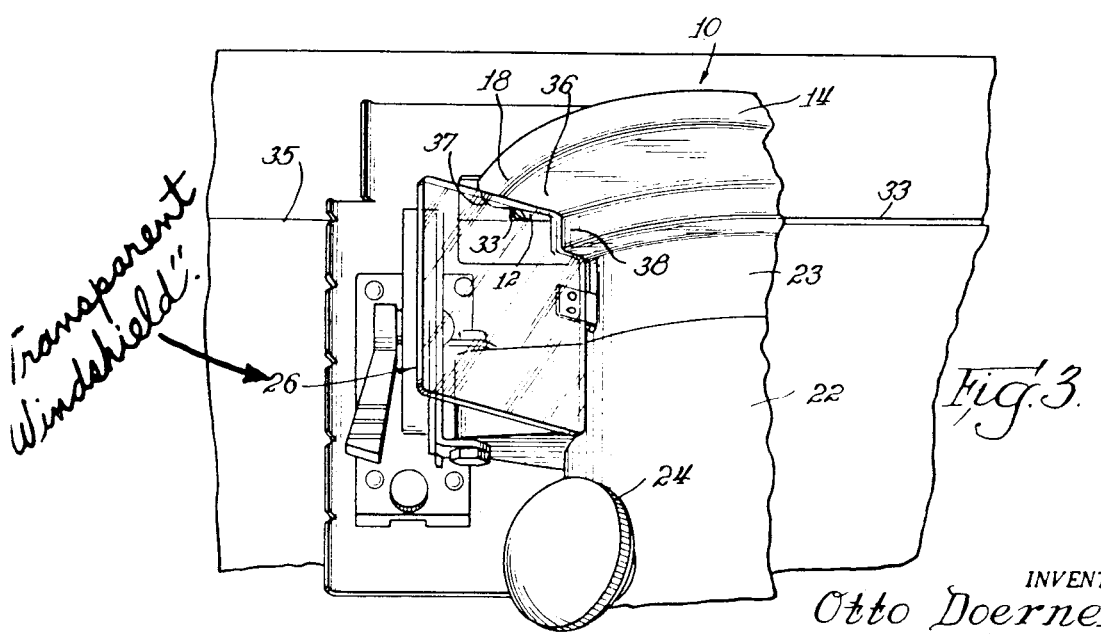
INVENTOR.
Otto Doerner

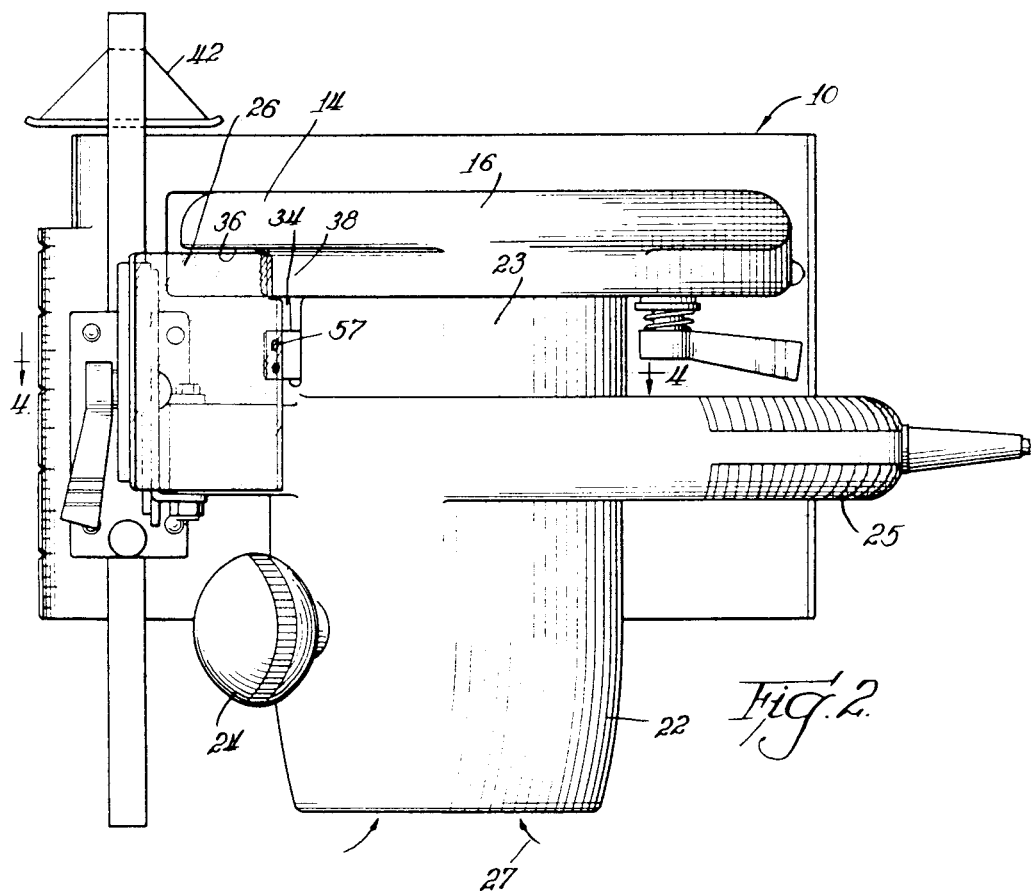
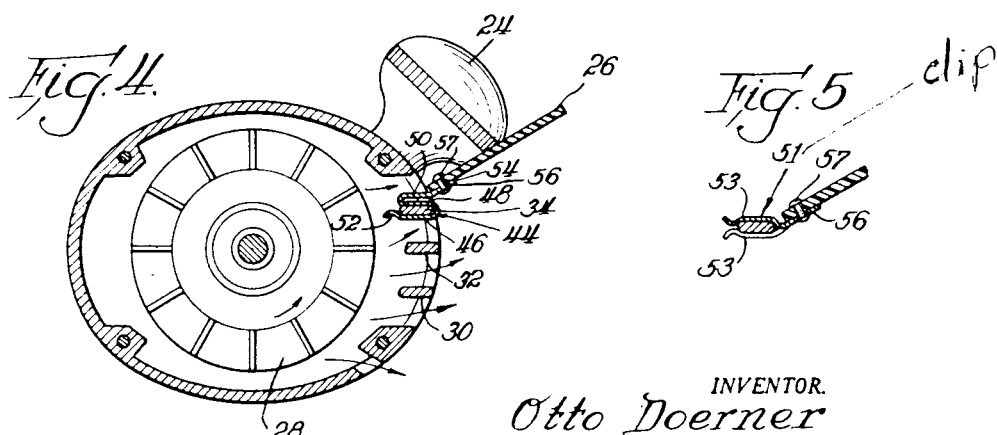

United States Patent Office 2,795,248
Patented June 11, 1957

2,795,248

EYEGUARD FOR POWER SAW

Otto Doerner, Chicago, Ill., assignor to Dormeyer Corporation, Chicago, Ill., a corporation of Illinois Application January 11, 1955, Serial No. 481,101

10 Claims. (Cl. 143—159)

This invention relates to portable power saws, and more particularly to a transparent shield for the operator which is kept clear by warm air of low humidity from the cooling system of the saw and protects the operator from flying particles thrown up by the whirling saw blade while affording a clear, direct view of the line of cut from a position or viewpoint most convenient to the operator who is handling the saw.

The metal guards which are usually disposed peripherally around the circular saw blade must extend at both ends very close to the work and be wide enough to afford protection from flying chips, etc., and clearance to replace the saw readily on its spindle. The use of metal guards for these purposes interferes with an accurate following of a pencil marking and requires aids and guides which do not satisfy skilled mechanics who desire to see exactly where the saw is cutting.

It is accordingly an object of the present invention to provide a construction wherein a mechanic can safely see the cut made by a circular saw while it is being made.

A further object is to provide an improved windshield arrangement which will protect the operator of a rotary power saw from the air blasts and particles of sawdust which are thrown by the saw while making a cut. A further object is to provide a transparent guard which is kept clear by a blast of warm air to prevent fogging under temperature and humidity changes so that accurate alignment of the sawblade with pencilled guidelines can be accomplished through direct vision of the cut being made by the blade.

Another object is to provide a transparent windshield which will not shatter under the impact of particles thrown against it during operation of a sawblade at high speeds.

Another object is to provide a windshield arrangement for a power saw which may be secured to the housing of the saw in a position to deflect substantially all air emanating from the blower away from the operator and across the windshield and the work to keep them both free of dust and chips.

Another object is to provide a removable windshield for a rotary power saw which will permit a reduction in the amount of metal required for the guard, and will permit washing.

Other objects of the invention are to provide a shield which is inexpensive and simple to manufacture and esthetic in appearance and which will enhance the usefulness of saws of the type indicated.

Referring now to the drawings:

Fig. 1 is a side elevational view of a standard power saw equipped with a windshield according to the present invention;

Fig. 2 is a top plan view of a power saw having secured thereto a shatterproof windshield according to the present invention;

Fig. 3 (sheet 1) is a top perspective view, partly broken away, of a windshield of the type indicated;

Fig. 4 is a vertical sectional view through the line 4—4 of Fig. 2 disclosing the position of the windshield on the gear housing of a standard rotary power saw, and Fig. 5 is a partial section showing another form of the invention.

Referring now to Fig. 1, the power saw 10 is shown which includes the rotary blade 12, a U-shaped metal safety guard 14 having an upper horizontal portion 16 and lower depending portion 18, a movable guard 19, an outside work guide 20, a motor housing 22 and gear housing 23 having handles 24 and 25 so disposed thereon that the two hands of the operator are to the left of the saw when using the saw. Thus it is natural for the operator to have his eyes above and to the left of the saw without physical strain or discomfort. From this point he can look down at the work to the left of the guard 14.

The housing 22 contains a blower or fan 28 which draws cool air into the housing as indicated by arrows 27, Fig. 2, through the motor parts where it picks up the heat of the motor, and ejects the warmed air through the exhaust ports defined by the ventilation vanes 30, 32 and 34 at high velocity.

A windshield 26 which is preferably rectangular but may be of any desired shape is detachably mounted upon the vane 34 where it extends forwardly past the guard 14 and laterally a substantial distance past the vent portions of the gear housing 22. The windshield is formed of Plexiglas, the trademarked material "Lucite" or any other material combining shatterproof characteristics with transparency and resistance to abrasion.

The windshield 26 preferably extends into abutting relation with the inset facing 36 of the guard 14 to the left thereof and along a radius of the blade, and is contoured to rest snugly on the fender 38 thereof where the blast of air from opposite sides of the vane 34 washes both sides of the windshield. Accordingly, the operator has a protected view of the cutting action of the saw as indicated at 33 from an angle only slightly removed from the vertical, similar to that observed in Fig. 3 where the saw cut 33 is following a pencilled line 35. With this arrangement, the lower end of the guard portion 18 at the front is terminated well above the surface of the work, as indicated at 37.

As can be appreciated from examination of Figs. 2 and 3, the oblique view of the cutting operation which is possible with the windshield of the invention also makes it possible to check the accuracy of other guide appliances on the saw, such as the T member 42 during operation of the saw. This is important because saws are interchangeably used which cut different widths of kerfs, and the saw can be manually guided to cut upon either side of the line 35.

The windshield is so disposed on the housing 23 that the warm air blast from the blower flows approximately in the plane of the windshield while the angle with respect to the cutting arc of the saw at maximum depth of cut causes chips striking the windshield to be deflected forwardly. Accordingly, as shown, the angle for the windshield will preferably be approximately that in which the plane of the windshield passes through or below the axis of rotation of the saw, i. e., at an upward inclination and perpendicular to the plane of the saw, yet will permit air blown from beneath the said topmost vane 34 to wash the under side of the windshield and flow in a direction away from the operator. Particles thrown up against the shield in this position will also rebound in an outward direction and so will not pile up on the piece being cut. The lowermost vane is so constructed as to deflect part of the air blast against the work at the cutting point of the saw to keep the work surface clean.

The means for positioning the windshield in the above-mentioned position is a substantially S-shaped spring clip 44 having a lower flange 46, intermediate flange or flat 48, an upper flange 50 as shown in Fig. 4 or a split clip 51 as shown in Fig. 5 in which three or more legs 53 straddle the vane under tension.

Flange 46 and an intermediate flat 48 are substantially parallel and are spaced from each other a distance slightly less than the thickness of the vane 34 as shown in Fig. 4. The flange 46 is provided with a snap or protuberance 52 such that when the clip 44 is inserted in tight engagement on the said vane, it will be held against accidental removal. The upper flange 50 is provided with an upwardly disposed tab 54 having apertures 56 whereby to be fastened by screws or rivets 57 or the like to the Plexiglas windshield 26. The tab 54 is set at the appropriate angle as already described for maximum clear vision and protection for the workman.

The windshield also serves to reduce or eliminate the chances of accidental contact between the saw blade and the workman's fingers holding the handle 24. Furthermore it is possible to effect a substantial reduction in the amount of metal needed for the upper guard 16 by eliminating a heavy section of the guard 14 below the windshield. This construction has the additional and important advantage of giving the operator an even fuller and more satisfactory view of the portion of the saw engaging the piece of work.

Although several constructions for the windshield of the invention are here shown and described, it will be understood and appreciated that certain details of construction may be altered or eliminated without detracting from the spirit of the invention as defined in the following claims.

I claim:

1. In combination with a power saw having a rotary blade and a guard therefor and an air cooling blower and motor in a housing therefor, a plurality of ventilating vanes in said housing, a transparent, substantially shatterproof windshield secured to one of said vanes in perpendicular relation to said blade adapted to afford a view of the operation of said saw along the line of cutting thereof without interference from particles from said blade and wind from said blower.

2. The construction according to claim 1 wherein said windshield is disposed at an upward inclination in the path of air from the blower.

3. The construction according to claim 1 wherein the plane of said windshield is substantially parallel with and in the path of air from the blower and disposed along a radius of the blade at an acute angle to the cutting arc sector of the blade.

4. In combination with a power saw having a rotary blade and a guard therefor, a motor and blower in a housing, a transparent substantially shatterproof windshield and a plurality of ventilating vanes in said housing, said windshield being secured to one of said vanes in abutting relation to one side of said guard and said housing and in perpendicular relationship to said blade whereby to afford protection against wind from said blower and particles from said blade during direct visual observation of the cutting action of said blade.

5. The construction according to claim 4 wherein said vanes are aligned in horizontal and parallel relationship and said windshield is secured to the topmost of said vanes.

6. In combination with a power saw having a rotary blade, a housing and a motor and blower in the housing, a plurality of ventilation vanes downstream of said blower in said housing, a transparent, substantially shatterproof windshield, and a spring clip secured to said windshield and adapted to snap over one of said vanes to hold said windshield in a position to be washed by air from the blower and obstruct the upward path of particles from said blade.

7. The combination called for in claim 6 wherein said clip has two spaced legs spaced apart slightly less than the width of one of said vanes and one of said legs having a snap protuberance adjacent the free end thereof adapted to engage the inner edge of one of said vanes when said clip is positioned thereupon whereby to removably secure said windshield to said housing.

8. The construction according to claim 7 wherein the upper transverse portion of said clip is offset upwardly relative to the two lower transverse portions of said clip at an angle substantially parallel to the direction of airflow from said blower beneath the uppermost vane when said clip is secured to said vane whereby impact force of the air blast is minimized and sawdust particles are deflected by said windshield.

9. In combination with a power saw having a rotary blade, a housing and a motor and blower in the housing, a plurality of ventilation vanes downstream of said blower in said housing, a transparent, substantially shatterproof windshield and means for removably securing said windshield to one of said vanes in a position to be washed by air from the blower and obstruct the upward path of particles from said blade.

10. In combination with a power saw having a housing ventilated by a blower and a guard, an inset facing on the upper and forward portion of said guard adjacent said housing and a transparent, substantially shatterproof windshield abutting said inset portion and said housing, in perpendicular relationship to the saw blade of the saw, said inset portion terminating above the corresponding outer side of said guard, a plurality of horizontal and parallel vanes in said housing, said windshield being secured to the uppermost of said vanes and inclined upwardly in a plane passing below the axis of rotation of the saw and perpendicular thereto whereby the draft and particles driven by the saw are deflected forwardly away from said saw.

References Cited in the file of this patent

UNITED STATES PATENTS

| | | |
|---|---|---|
| 596,762 | Sevison | Jan. 4, 1898 |
| 1,708,345 | Wodack et al. | Apr. 9, 1929 |
| 1,830,579 | Wappat | Nov. 3, 1931 |
| 1,932,511 | Clarke | Oct. 31, 1933 |